No. 749,090. PATENTED JAN. 5, 1904.
J. P. OLSON.
RAKER GAGE AND JOINTER.
APPLICATION FILED SEPT. 23, 1903.
NO MODEL.
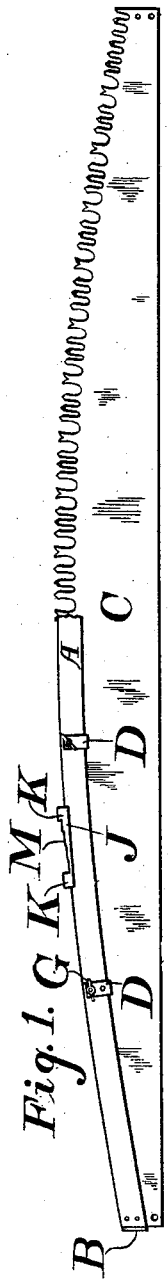
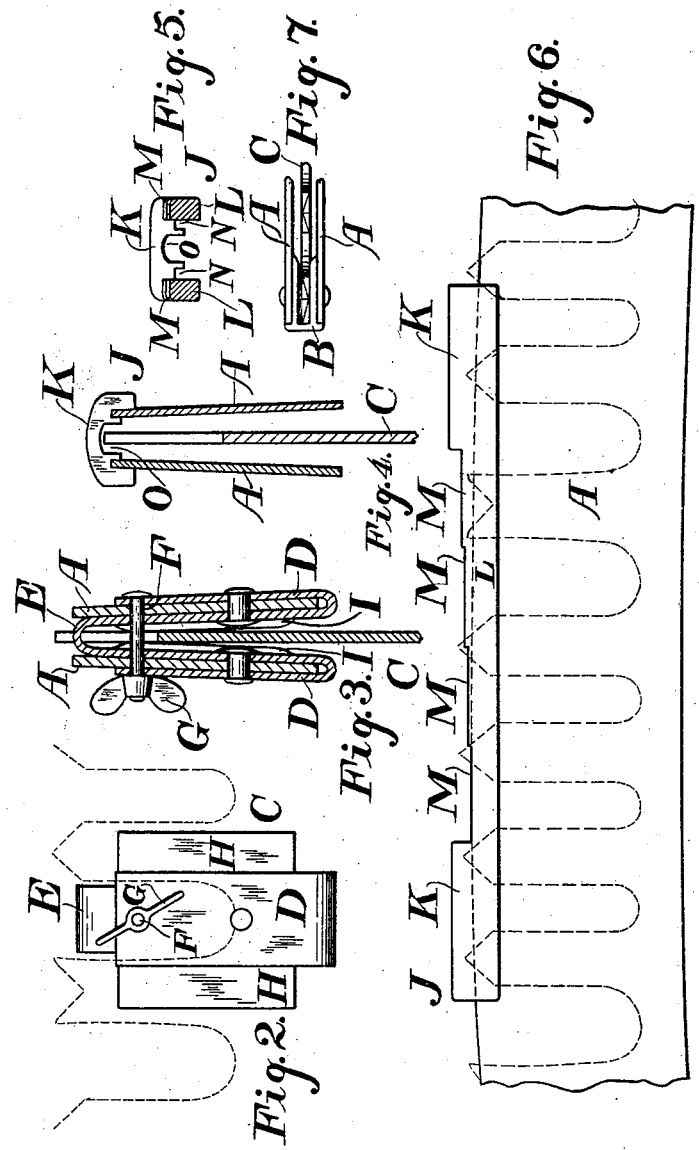
WITNESSES:
John P. Olson
INVENTOR.
BY
ATTORNEY.

No. 749,090.

Patented January 5, 1904.

UNITED STATES PATENT OFFICE.

JOHN P. OLSON, OF NEAR TACOMA, WASHINGTON.

RAKER GAGE AND JOINTER.

SPECIFICATION forming part of Letters Patent No. 749,090, dated January 5, 1904.

Application filed September 23, 1903. Serial No. 174,337. (No model.)

*To all whom it may concern:*

Be it known that I, JOHN P. OLSON, a citizen of the United States, residing near Tacoma, in the county of Pierce and State of Washington, have invented certain new and useful Improvements in Raker Gages and Jointers, of which the following is a specification.

My invention relates to devices which being applied to a saw indicate the lines to which the teeth and rakers must be jointed; and the objects of my invention are to provide a device attached to a saw which will first protect the teeth when the saw is being shipped or stored; second, give the proper curve for the cutting-line of the teeth at all times; third, save the eyesight from unnecessary strain while jointing with great accuracy, and, fourth, permit of truing off the teeth after their having been filed. I attain these objects by the devices illustrated in the accompanying drawings, in which—

Figure 1 is a side view of a saw with one of my devices attached thereto, said device being broken away near the center to show the teeth of said saw. Fig. 2 is an enlarged view of the clamp separated from the bar-gage. Fig. 3 is a cross-section of a saw with my device attached thereto, said section being taken through a clamp. Fig. 4 is a similar view, the section being taken between the clamps and showing the sliding gage in end elevation. Fig. 5 is a cross-section of the sliding gage. Fig. 6 is a side view of the sliding gage mounted on the bar-gage, and Fig. 7 is a top view of the end of the saw and the bar-gage.

Similar letters of reference refer to similar parts throughout the several views.

The two bar-gages A are formed of metal and have their upper edges shaped to conform with the line of the points of the teeth when the saw is new. These bars A are secured together at their ends by the pieces B, shaped substantially as shown in Fig. 7 and adapted to pass around the end of the saw C and fitting close enough to steady it, but not close enough to clamp the bars A to the saw C.

At intervals along the length of the bars A, I provide clamps. These clamps are spaced so as to always come beside a raker, as shown in Fig. 2. The clamps D are each made of a piece of metal bent so as to form two separated U shapes, the bars A being clamped and riveted into the U parts and the saw being clamped into the space between the U parts. The portion E joining the U parts is made sufficiently narrow to readily pass between the raker and the adjoining tooth. The clamping-bolt F passes through the four folds of the clamp D and through the two bars A and between the raker and the adjoining tooth and is provided with a thumbnut G, whereby the parts are compressed together to clamp them to the saw C. The sides of U parts adjacent to the saw C are provided with extensions H and with clamping parts I, adapted to engage the raker and the saw-tooth, as shown in Figs. 2 and 3.

The sliding gage J consists of a piece of metal, preferably case-hardened and formed with two head-pieces K, two side pieces L, having their upper surfaces stepped, as at M, grooves N in the lower surfaces of the heads K and adapted to engage the bars A, and a groove O between said grooves N and adapted to allow the gage J to pass freely over the saw-teeth. This gage J is adapted to be placed on the gage-bars A and to be slid thereon to any portion on the saw.

My device is used in the following manner: The bar-gage is placed on the saw and is adjusted so that its upper edge is just below the point of the lower raker, and it is then firmly clamped in that position by tightening the thumb-nuts G. Then the sliding-gage J is taken and placed at one end and each tooth is jointed to the level of one of the higher steps M and each raker jointed to the level of one of the lower steps M. The gage J is slid along the bars A to any position thereon. When all the teeth and rakers have been jointed, the gage may be removed and the teeth filed or sharpened. In the process of filing the teeth are apt to lose their level. In cases where the sawing must be very accurate it is necessary that the teeth be on the same level, or else the saw swerves to one side, and in such cases the gage-bar may be replaced and the teeth and rakers again lightly jointed, so as to reduce them all to exactly the same level.

When it is desired to store the saw or to ship it in any manner, the gage-bars A are placed on the saw and are clamped thereon in such position as to completely cover and protect the teeth. For very long saws a stiffener may be formed on one or both of the bars A.

What I claim, and desire to secure by Letters Patent, is—

1. In a saw-gage, the combination with a pair of gage-bars, of means for clamping said bars to a saw, and a sliding gage adapted to slide on said gage-bars and formed with a series of steps to guide and limit a file whereby the teeth may be jointed to one level and the rakers to a lower level.

2. In a saw-gage, the combination with a pair of gage-bars, of double U-shaped clamp-pieces secured to said gage-bars and adapted to pass to each side of the saw between the teeth thereof, and a clamping bolt and nut adapted to compress said clamp-pieces against the saw and to clamp said gage-bars to the saw.

3. In a saw-gage, the combination with a pair of gage-bars adapted to be clamped to the saw and provided with their upper edges shaped so as to conform with the line of the cutting edges of said saw, of a sliding gage adapted to slide on said gage-bars and provided with a series of steps on each side of the saw to guide and limit a file whereby the saw-teeth projecting above and between said steps may be jointed to one level and the rakers to a lower level.

In testimony whereof I have signed my name to this specification in the presence of two subscribing witnesses.

JOHN P. OLSON.

Witnesses:
JNO. D. FLETCHER,
FREDERIC J. SHAW.